(12) United States Patent
Kang et al.

(10) Patent No.: US 9,161,243 B2
(45) Date of Patent: Oct. 13, 2015

(54) COEXISTENCE MANAGEMENT SYSTEM FOR MEASURING CHANNEL INFORMATION BETWEEN SPECTRUM SHARING DEVICES AND METHOD THEREOF

(71) Applicant: Electronics and Telecommunications Research Institute, Daejeon (KR)

(72) Inventors: Hyun Duk Kang, Gwangju (KR); Dong Hun Lee, Daejeon (KR); Byung Jang Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 149 days.

(21) Appl. No.: 13/923,262

(22) Filed: Jun. 20, 2013

(65) Prior Publication Data

US 2014/0018117 A1 Jan. 16, 2014

(30) Foreign Application Priority Data

Jul. 13, 2012 (KR) .................. 10-2012-0076855
Mar. 28, 2013 (KR) .................. 10-2013-0033231

(51) Int. Cl.
*H04B 17/00* (2015.01)
*H04W 24/02* (2009.01)
*H04W 16/14* (2009.01)

(52) U.S. Cl.
CPC ............. *H04W 24/02* (2013.01); *H04W 16/14* (2013.01)

(58) Field of Classification Search
CPC .............................. H04W 24/02; H04W 16/14
USPC ....................................... 455/67.11, 501, 63.1
See application file for complete search history.

(56) References Cited

U.S. PATENT DOCUMENTS

2001/0031626 A1 10/2001 Lindskog et al.
2007/0053319 A1 3/2007 Hulbert
2012/0115525 A1 5/2012 Kang et al.

FOREIGN PATENT DOCUMENTS

EP          2640144 A1   9/2013
WO   WO 2012/095555 A1   7/2012

*Primary Examiner* — Eugene Yun

(57) ABSTRACT

Provided are a coexistence management system for measuring channel information between spectrum sharing devices and a method thereof. The coexistence management system for measuring channel information between spectrum sharing devices according to the exemplary embodiment of the present invention includes: a plurality of coexistence enablers (CEs) which is provided for each of the plurality of white space objects (WSOs) having at least one measurement capability of measuring channel information on an operation channel that is being used; a coexistence manager (CM) which is linked with at least one CE within a group to confirm measurement capability of a corresponding WSO and receives channel information on the operation channel from one or more WSOs within another neighboring groups according to the confirmed result; and a coexistence discovery and information server (CDIS) which registers at least one measurement capability for each of the plurality of WSOs.

19 Claims, 8 Drawing Sheets

FIG.6
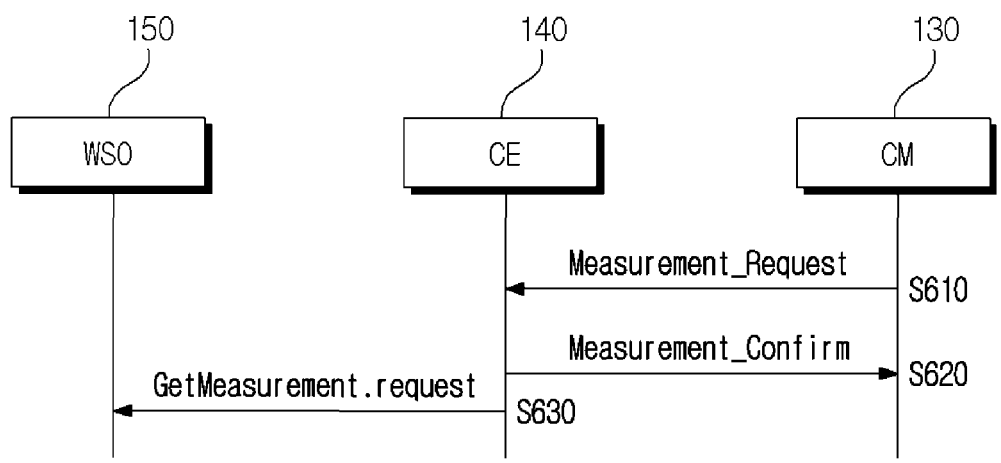
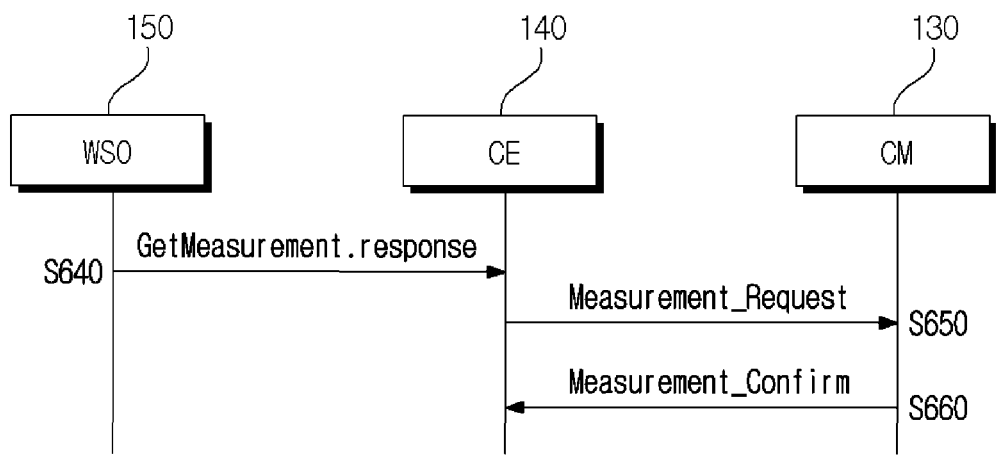

_COEXISTENCE MANAGEMENT SYSTEM FOR MEASURING CHANNEL INFORMATION BETWEEN SPECTRUM SHARING DEVICES AND METHOD THEREOF_

CROSS-REFERENCE TO RELATED APPLICATIONS

This application claims priority to and the benefit of Korean Patent Application No. 10-2012-0076855 filed in the Korean Intellectual Property Office on Jul. 13, 2012, and Korean Patent Application No. 10-2013-0033231 filed in the Korean Intellectual Property Office on Mar. 28, 2013, the entire contents of which are incorporated herein by reference.

TECHNICAL FIELD

The present invention relates to a coexistence management system, and more particularly, to a coexistence management system for measuring channel information between spectrum sharing devices, which allows a spectrum sharing device to measure corresponding channel information using at least one neighboring spectrum sharing device when the spectrum sharing device may not measure preset channel information due to a limitation of its own measurement capability, and a method thereof.

BACKGROUND ART

In general, a coexistence technology is a spectrum management technology in which wireless devices using different communication protocols at a core frequency (30 MHz to 10 GHz), in which various dynamic spectrum access (DSA) technologies are expected to be emerged, coexist without harmful interference. In particular, the DSA technologies, such as an underlay, an overlay, and the like, which use an opposing concept to a current static spectrum management technology, are a wireless access and management technology which dynamically manages a spectrum depending on radio environments around wireless devices to maximize flexibility and efficiency of the frequency use. In order to prepare for spectrum sharing technologies which variously emerge for each wireless service, such as IEEE 802, SCC 41, and the like, a technology of deriving coexistence standards capable of comprehensively operating a plurality of sharing technologies in terms of spectrum management by various countries has been developed.

Researches into integrated coexistence conditions of various sharing technologies for securing optimal frequency efficiency among various spectrum sharing devices under congested radio environments, such as a frequency auction system, a sharing of a licensed band and an unlicensed band, and the like, have not systematically been conducted domestically.

However, technical issues about a coexistence scenario between spectrum sharing wireless systems in the licensed band and the unlicensed band, coexistence analysis, a sharing mechanism for coexistence, and the like, have been discussed in the wireless coexistence working group (WG) belonging to the international organization for standardization, the IEEE 802.19 and handling a coexistence problem between 802 standards.

SUMMARY OF THE INVENTION

The present invention has been made in an effort to provide a coexistence management system for measuring channel information between spectrum sharing devices, which allows a spectrum sharing device to measure corresponding channel information using at least one neighboring spectrum sharing device when the spectrum sharing device may not measure preset channel information due to a limitation of its own measurement capability, and a method thereof.

However, objects of the present invention are not limited the above-mentioned matters and other objects can be clearly understood to those skilled in the art from the following descriptions.

An exemplary embodiment of the present invention provides a coexistence management system for measuring channel information between spectrum sharing devices, including: a plurality of coexistence enablers (CEs) which is provided for each of the plurality of white space objects (WSOs) having at least one measurement capability of measuring channel information on an operation channel that is being used; a coexistence manager (CM) which is linked with at least one CE within a group to confirm measurement capability of a corresponding WSO and receives channel information on the operation channel from one or more WSOs within another neighboring group according to the confirmed result; and a coexistence discovery and information server (CDIS) which registers at least one measurement capability for each of the plurality of WSOs.

The CM may confirm whether the corresponding WSO within the group has the measurement capability of measuring preset channel information, and if it is confirmed that the WSO does not have the corresponding measurement capability, receive the channel information on the operation channel from one or more WSOs within another neighboring group.

The CM may select one WSO located at the closest distance among the one or more WSOs within another neighboring group to confirm the measurement capability of the selected WSO and if it is confirmed that the selected WSO has the measurement capability, receive the channel information on the operation channel to be measured from the selected WSO.

The CM may select one WSO located at the closest distance among the one or more WSOs within another neighboring group to confirm the measurement capability of the selected WSO and if it is confirmed that the selected WSO does not have the measurement capability, select another WSO among the one or more WSOs within another neighboring group.

If it is confirmed that any of the one or more WSOs within another neighboring group do not have the measurement capability, the CM may determine that the measurement using the one or more neighboring WSOs fails.

The CM may confirm the measurement capability of all the one or more WSOs within another neighboring group, receive the channel information on the operation channel to be measured from all the one or more WSOs having the measurement capability according to the confirmed result, and determine the channel information on the corresponding channel based on the received channel information.

The CM may confirm the measurement capability of all the one or more WSOs within another neighboring group and if it is confirmed that there are no one or more WSOs having the measurement capability, determine that the measurement using one or more neighboring WSOs fails.

The CM may link the CE within the group to request the channel information to the corresponding WSO, and receive the channel information measured by the corresponding WSO from the CE as a response thereto. The CM may receive the channel information measured from the WSO within the group.

The CE may request at least one measurement capability to a WSO to which the CE belongs when the WSO is newly configured and receives the at least one measurement capability as a response thereto and register the at least one received measurement capability of the WSO in the CDIS.

The CE may receive at least one measurement capability from the corresponding WSO when the information of the WSO to which the CE belongs is changed and register the at least one received measurement capability of the WSO in the CDIS.

The CM may receive a request for the channel information through one or more neighboring WSOs from the corresponding WSO within the group, and receive the channel information measured by one or more WSOs belonging to another neighboring group as the response thereto to provide the received channel information to the corresponding WSO requesting the channel information.

Another exemplary embodiment of the present invention provides a method for measuring channel information between spectrum sharing devices of a coexistence management system, the method including: linking at least one coexistence enabler within a group to confirm measurement capability of a corresponding white space object (WSO) including the linked CE; receiving channel information on the operation channel from one or more WSOs within another neighboring group according to the confirmed result; and determining the channel information on the operation channel based on the received channel information.

The receiving may include confirming whether the corresponding WSO within the group has the measurement capability of measuring preset channel information, and receiving the channel information on the operation channel from one or more WSOs within another neighboring group, if it is confirmed that the WSO does not have the corresponding measurement capability.

The receiving may include selecting one WSO located at the closest distance among the one or more WSOs within another neighboring group, confirming the measurement capability of the selected WSO and receiving the channel information on the operation channel to be measured from the selected WSO, if it is confirmed that the selected WSO has the measurement capability.

The receiving may include selecting one WSO located at the closest distance among the one or more WSOs within another neighboring group, confirming the measurement capability of the selected WSO and selecting another WSO among the one or more WSOs within another neighboring group, if it is confirmed that the selected WSO does not have the measurement capability.

The determining may include determining that the measurement using one or more neighboring WSOs fails, if it is determined that any of the one or more WSOs within another neighboring group do not have the measurement capability.

The determining may include confirming the measurement capability of all the one or more WSOs within another neighboring group, receiving the channel information on the operation channel to be measured from all the one or more WSOs having the measurement capability according to the confirmed result, and determining the channel information on the corresponding channel based on the received channel information.

The determining may include confirming the measurement capability of all the one or more WSOs within another neighboring group, and determining that the measurement using one or more neighboring WSOs fails, if it is confirmed that there are no one or more WSOs having the measurement capability.

According to the exemplary embodiments of the present invention, even when the spectrum sharing device cannot measure the preset channel information due to the limitation of its own measurement capability, it is possible to measure the corresponding channel information using one or more neighboring spectrum sharing device, thereby more reliably measuring the channel information.

According to the exemplary embodiments of the present invention, it is possible to perform the measurement using at least one neighboring spectrum sharing device, thereby improving the spectrum sharing efficiency between the plurality of spectrum sharing devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a diagram for describing a channel measuring process according to an exemplary embodiment of the present invention.

Figure 1:
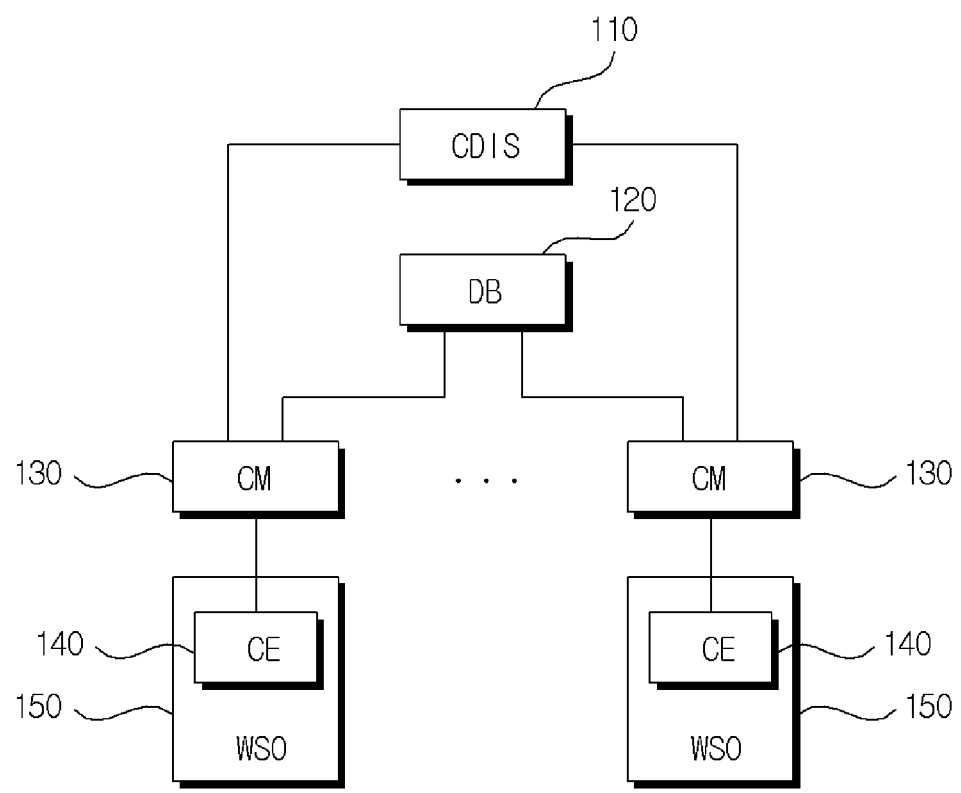
FIG. 1 is a diagram illustrating a coexistence management system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a coexistence management system for measuring channel information between spectrum sharing devices and a method thereof according to an exemplary embodiment of the present invention will be described with reference to FIGS. 1 to 8. Components required for understanding an operation and an action according to the exemplary embodiment of the present invention will be mainly described in detail.

In describing components of the present invention, like components may be denoted by different reference numerals throughout the drawings and may also be denoted by like reference numerals despite different drawings. However, even in the above-mentioned case, it is not meant that the corresponding components have different functions according to exemplary embodiments or the same functions in different exemplary embodiments, and functions of each component are to be determined based on the description of each component in the corresponding exemplary embodiment.

In particular, when a spectrum sharing device may not measure preset channel information due to a limitation of its own measurement capability, the present invention proposes a new measurement method for measuring corresponding channel information using at least one neighboring spectrum sharing device.

FIG. 1 is a diagram illustrating a coexistence management system according to an exemplary embodiment of the present invention.

As illustrated in FIG. 1, a coexistence management system according to an exemplary embodiment of the present invention may be configured to include a coexistence discovery and information server (CDIS) 110, a channel information database (DB) 120, coexistence managers (CMs) 130, coexistence enablers (CEs) 140, spectrum sharing devices or white space objects (WSOs) 150, and the like.

The CDIS 110 refers to an entity which serves to assist in a decision associated with a control of a spectrum sharing device of the CM. The CDIS 110 may be linked with the plurality of CMs 130 to provide or receive various types of information.

The channel information DB 120 may store channel information which can be used by the spectrum sharing devices.

The CM 130 refers to an entity which makes a decision associated with spectrum sharing, such as operation frequency allocation, transmission power allocation, transmission time allocation, and the like, so as to improve the spectrum sharing efficiency among a plurality of spectrum sharing devices.

The CM 130 may collect channel information, and the like, which is measured by the spectrum sharing devices. In particular, when the CM 130 needs to cooperate with another CM which controls another spectrum sharing device, the CM 130 may exchange information with another CM or exchange information through the CDIS 110.

The CM 130 may be linked with the channel information DB 120 to receive the channel information.

The CE 140 refers to an entity which is present within the spectrum sharing device and serves as a path between the CM and the spectrum sharing device.

The CE 140 may extract context information, such as a wireless access scheme, transmission power, a spectrum sensing threshold value, a position, and the like, which are associated with the corresponding spectrum sharing device requested by the CM 130, from the spectrum sharing device 150 and transmit the context information to the CM 130 requesting the context information.

The CE 140 may provide event information, such as changes, and the like, of the context information requested from the CM 130 and reflect resetting of a configuration of the spectrum sharing device instructed by the CM 130 to the corresponding spectrum sharing device.

The WSO 150, which is a spectrum sharing device, may be previously registered in the CM 130 through the CE 140. The WSO 150 may register measurement capability along with an ID of the WSO, a type of device, a wireless access scheme, and the like. For example, the measurement capability may include feature measurement capability, energy measurement capability, and the like.

In this case, since the WSOs 150 may have different measurement capabilities, the WSO performs the measurement, which cannot be performed by the WSO, using at least one neighboring spectrum sharing device.

Figure 2:
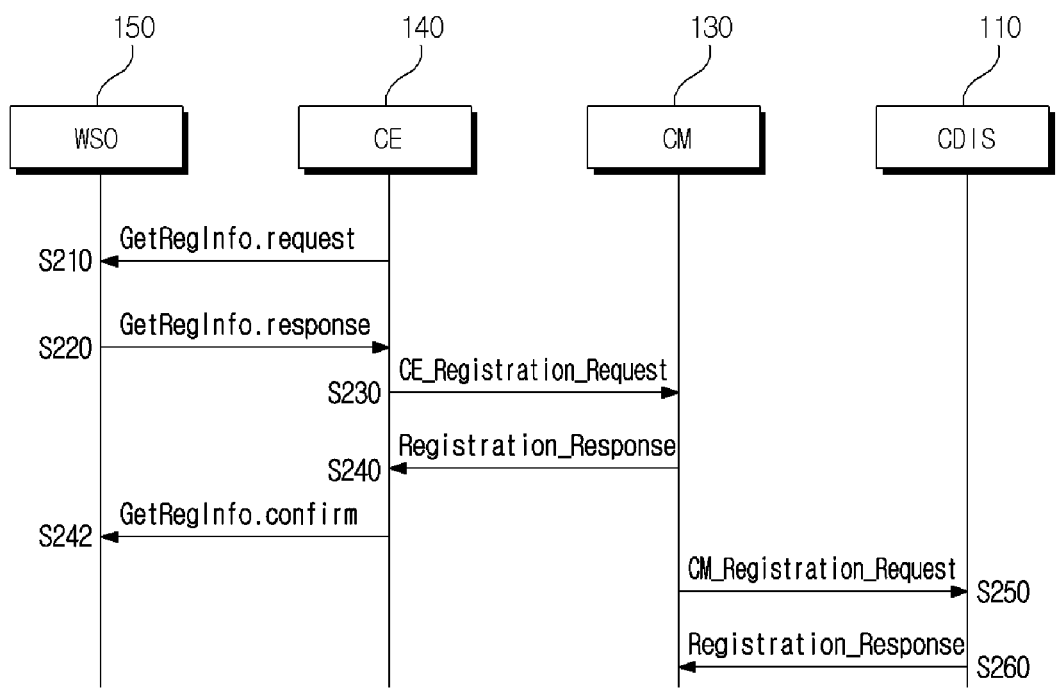
FIG. 2 is a diagram for describing a WSO registering process according to an exemplary embodiment of the present invention.

FIG. 2 is a diagram for describing a WSO registering process according to an exemplary embodiment of the present invention.

As illustrated in FIG. 2, when the WSO 150 is newly configured in the system, a CE 1400 within the newly configured WSO 150 may transmit a GetReInfo.request primitive for requesting information of the WSO to the corresponding WSO 150 (S210).

Next, when the WSO 150 receives the GetReInfo.request primitive, the WSO 150 may transmit a GetReInfo.response primitive for providing the information of WSO as a response to the received GetReInfo.request primitive to the CE 140 (S220).

In this case, an Indication based primitive used herein is shown as in the following [Table 1].

TABLE 1

| | |
|---|---|
| GetRegInfo.request ( ) | |
| GetRegInfo.response { | |
|     measurementCapability | OPTIONAL |
| } | |
| MeasurementCapability :: = ENUMERATED { | |
|     energyDetection, | |
|     featureDetection, | |
|     ... | |
| } | |

As in [Table 1], the GetReInfo.Response primitive may include the measurement capability of the WSO, which is to be registered, for example, energy measurement capability, feature measurement capability, and the like.

Next, when the CE 140 receives the GetReInfo.response primitive, the CE 140 may transmit a CE_Registration_Request message for requesting the registration of the corresponding WSO based on the information included in the received GetReInfo.response primitive to the corresponding CM 130 (S230) and receive a Registration_Response message from the corresponding CM 130 as a response thereto (S240).

In this case, the CE 140 may transmit a GetRegInfo.confirm primitive to the WSO 150 (S242).

Next, when the CM 130 receives the received CE_Registration_Request message, the CM 130 may transmit the CM_Registration_Request message for requesting the registration of the corresponding WSO to the CDIS 110 (S250) and receive a Registration_Response message from the CDIS 110 as a response thereto (S260).

A Request/Response based message used herein is shown as in the following [Table 2].

TABLE 2

| | | |
|---|---|---|
| CE_Registration_Request ::= SEQUENCE { | | |
|     measurementCapability | MeasurementCapability | |
|     OPTIONAL | | |
| } | | |
| CM_Registration_Request ::= SEQUENCE { | | |
|     measurementCapability | MeasurementCapability | |
|     OPTIONAL | | |
| } | | |

TABLE 2-continued

```
Registration_Response ::= SEQUENCE {
}
MeasurementCapability ::= ENUMERATED {
              energyDetection,
              featureDetection,
              ...
}
```

Herein, a parameter energyDetection represents the energy measurement capability and a parameter featureDetection represents the feature measurement capability.

As in [Table 2], the CE_Registration_Request message may include the measurement capability of the WSO to be registered, for example, the energy measurement capability, the feature measurement capability, and the like.

Figure 3:
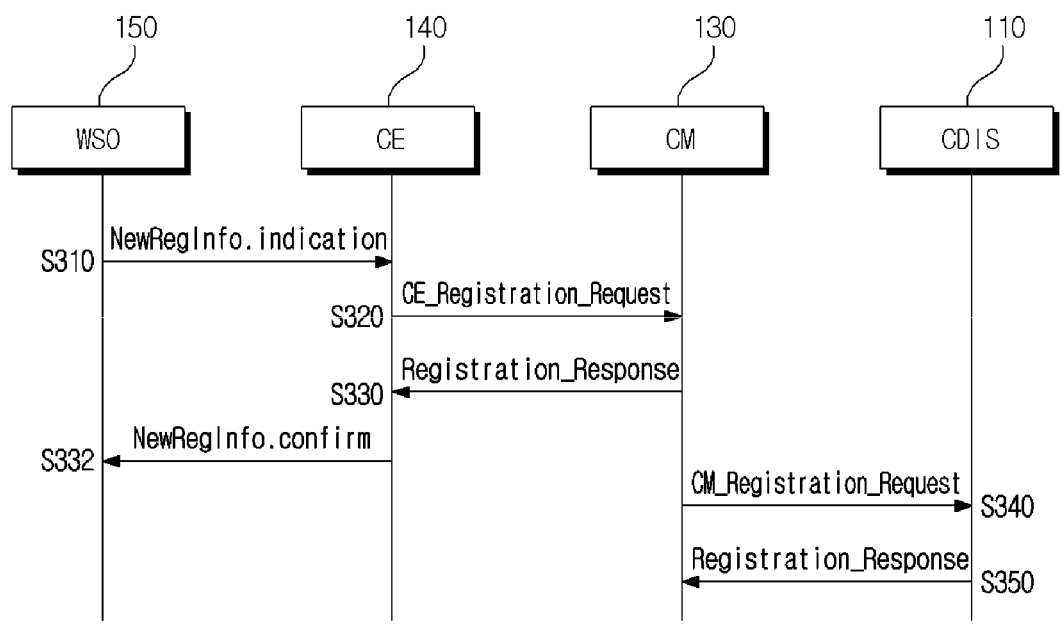
FIG. 3 is a diagram for describing a WSO registering process according to an exemplary embodiment of the present invention.

FIG. 3 is a diagram for describing a WSO registering process according to an exemplary embodiment of the present invention.

As illustrated in FIG. 3, when the information of the pre-registered WSO 150 is changed, the WSO 150 with the changed information may transmit a NewRegInfo.indication primitive for requesting the registration of the corresponding information to the corresponding CE 140 (S310).

Next, when the CE 140 receives the NewRegInfo.indication primitive, the CE 140 may transmit a CE_Registration_Request message for requesting the registration of the corresponding information to the CM 130 (S320) and receive a Registration_Response message from the CM 130 as a response thereto (S330).

In this case, the CE 140 may transmit a NewRegInfo.confirm primitive to the WSO 150 (S332).

When the CM 130 receives the CE_Registration_Request message, the CM 130 may transmit a CM_Registration_Request message for requesting the registration of the corresponding information to the CDIS 110 (S340) and receive a Registration_Response message from the CDIS 110 as a response thereto (S350).

Figure 4:
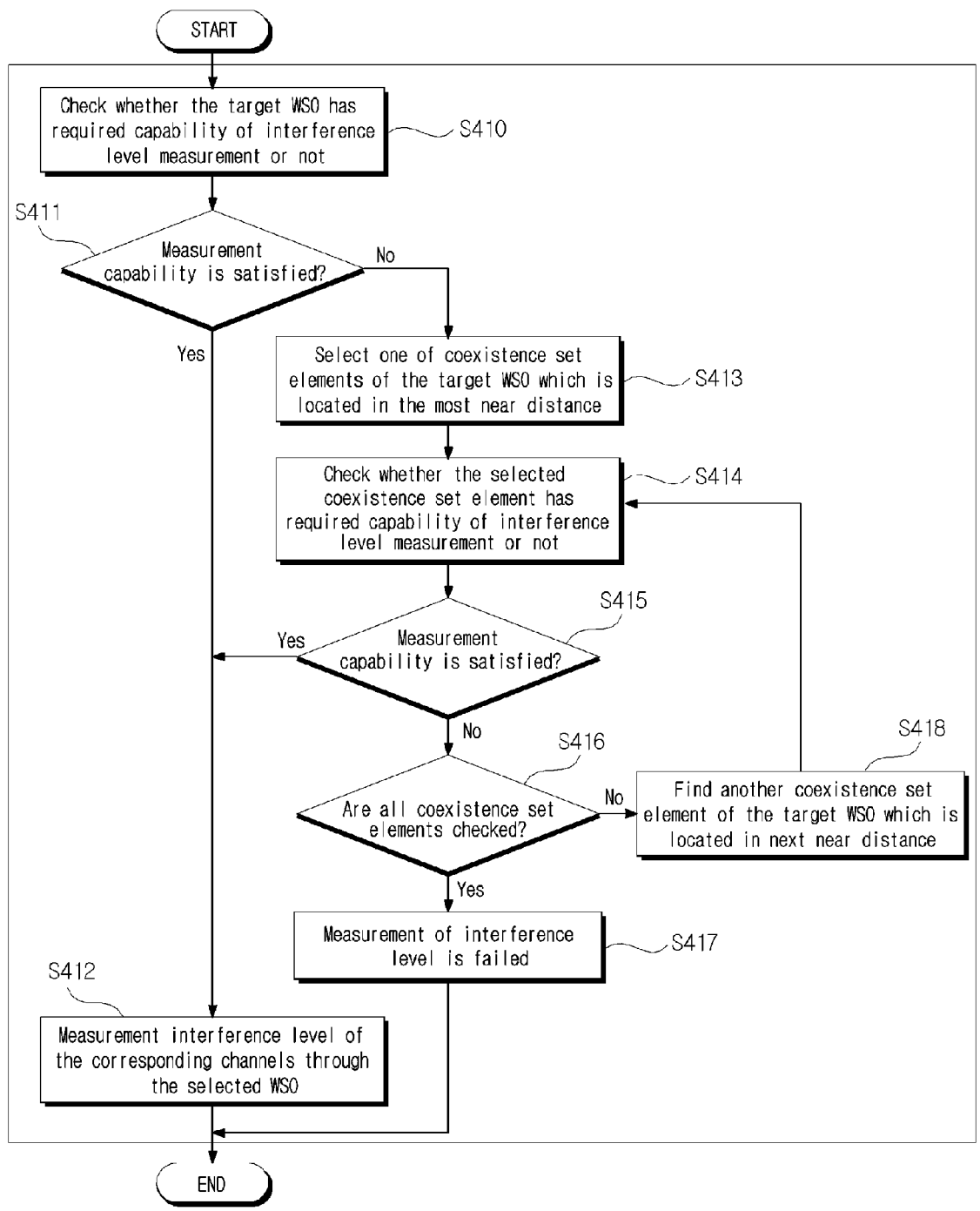
FIG. 4 is a diagram illustrating a method for measuring channel information according to an exemplary embodiment of the present invention.

FIG. 4 is a diagram illustrating a method for measuring channel information according to an exemplary embodiment of the present invention.

As illustrated in FIG. 4, the coexistence management system according to the exemplary embodiment of the present invention may confirm whether the target WSO has the capability of measuring an interference level of the channel that is being used (S410).

Next, if the coexistence management system determines according to the confirmed result that the target WSO does not have the capability of measuring the interference level (S411), the coexistence management system may select any one of one or more WSOs neighboring the target WSO.

For example, the coexistence management system may generate a neighboring list including one or more WSOs neighboring the target WSO to select any one of the one or more WSOs neighboring the target WSO included in the generated neighboring list. In this case, the coexistence management system selects a WSO located at the closest distance among one or more WSOs neighboring the target WSO.

On the other hand, if the coexistence management system determines that the target WSO has the capability of measuring the interference level (S411), the coexistence management system may measure the interference level of the corresponding channel through the target WSO (S412).

Next, the coexistence management system may confirm whether the selected one WSO has the capability of measuring the interference level (S414).

Next, if the coexistence management system determines according to the confirmed result that the selected one WSO does not have the capability of measuring the interference level (S415), the coexistence management system may determine whether the measurement capability of all the neighboring WSOs is confirmed (S416).

On the other hand, if the coexistence management system determines that the selected WSO has the capability of measuring the interference level, the coexistence management system may measure the interference level of the corresponding channel through the selected WSO (S412).

Next, if the coexistence management system determines that the measurement capability of all the neighboring WSOs is not confirmed, the coexistence management system may select another WSO among one or more neighboring WSOs (S418).

On the other hand, if the coexistence management system determines that the measurement capability of all the neighboring WSOs is confirmed, the coexistence management system determines that any of the WSOs do not have the capability of measuring the interference level, such that it may be determined that the measurement of the interference level using the neighboring WSOs fails (S417).

Figure 5:
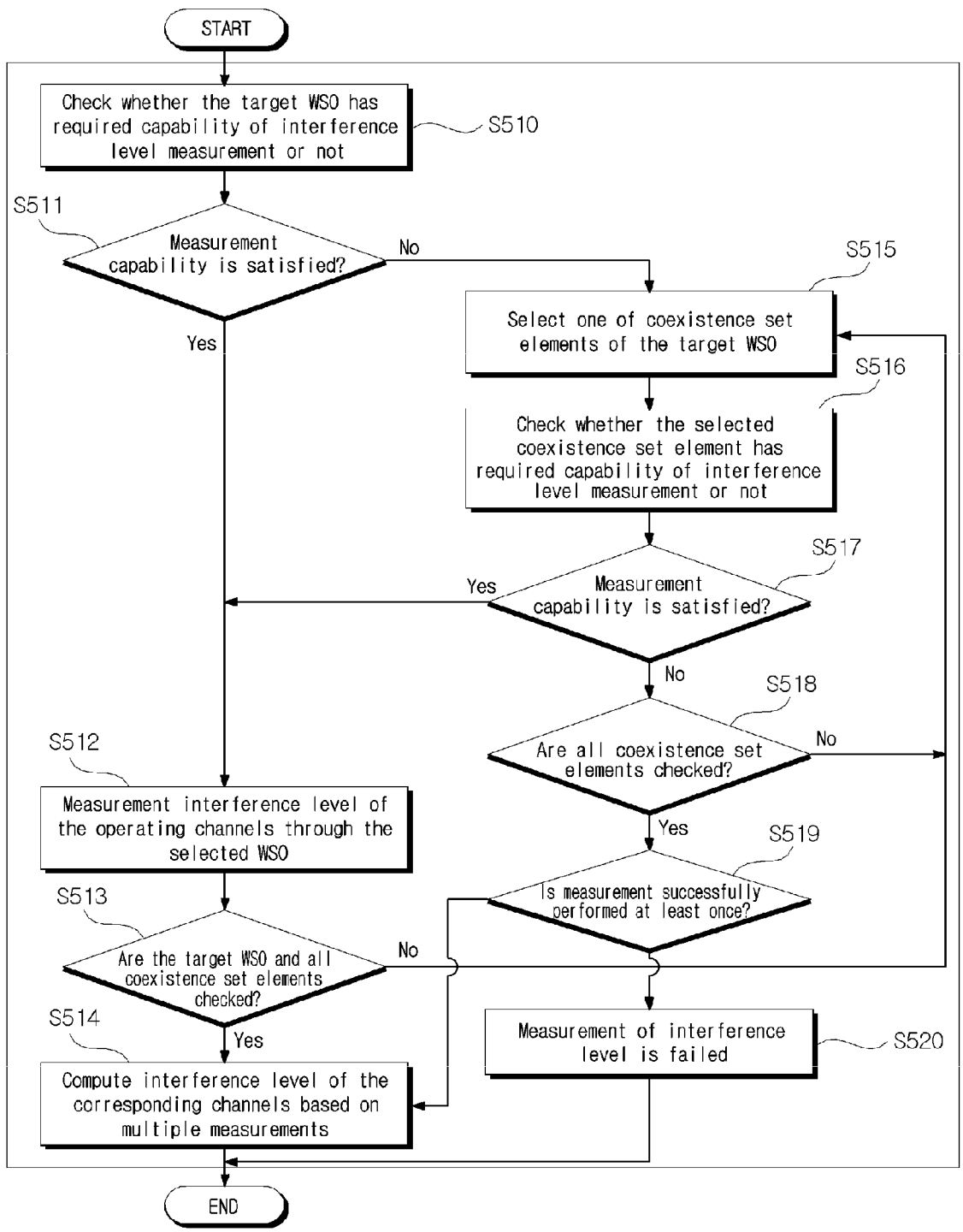
FIG. 5 is a diagram illustrating a method for measuring channel information according to an exemplary embodiment of the present invention.

FIG. 5 is a diagram illustrating a method for measuring channel information according to an exemplary embodiment of the present invention.

As illustrated in FIG. 5, the coexistence management system according to the exemplary embodiment of the present invention may confirm whether the target WSO has the capability of measuring the interference level of the channel that is being used (S510).

Next, if the coexistence management system determines according to the confirmed result that the target WSO does not have the capability of measuring the interference level (S511), the coexistence management system may select any one of one or more WSOs neighboring the target WSO.

For example, the coexistence management system may generate a neighboring list including one or more WSOs neighboring the target WSO to select any one of the one or more WSOs neighboring the target WSO included in the generated neighboring list (S515). In this case, the coexistence management system selects a WSO located at the closest distance among one or more WSOs neighboring the target WSO.

On the other hand, if the coexistence management system determines that the target WSO has the capability of measuring the interference level (S511), the coexistence management system may measure the interference level of the corresponding channel through the target WSO (S512).

The coexistence management system confirms whether all the WSOs complete the measurement (S513) and if it is confirmed that all the WSOs complete the measurement, the coexistence management system may determine the interference channel of the corresponding channel (S514).

In this case, all the WSOs vary depending on the measurement capability of the target WSO. That is, if the target WSO has the capability of measuring the interference level, the coexistence management system reflects the interference level measured by the target WSO and if the target WSO does not have the capability of measuring the interference level, the coexistence management system reflects the interference level measured by the one or more neighboring WSOs.

Next, the coexistence management system may confirm whether the selected one WSO has the capability of measuring the interference level (S516).

Next, if the coexistence management system determines according to the confirmed result that the selected one WSO does not have the capability of measuring the interference level (S517), the coexistence management system may confirm whether all the neighboring WSOs complete the measurement (S518).

On the other hand, if the coexistence management system determines that the selected WSO has the capability of measuring the interference level (S517), the coexistence management system may measure the interference level of the corresponding channel through the selected WSO (S512).

Next, if the coexistence management system determines according to the confirmed result that all the WSOs complete the measurement, the coexistence management system may confirm whether one or more WSOs within a neighboring list successfully perform the measurement (S519).

On the other hand, if it is confirmed that any of the WSOs do not perform the measurement, the coexistence management system may select one WSO again in the previously generated neighboring list (S515).

Next, if it is confirmed that the one or more WSOs successfully perform the measurement, the coexistence management system may determine the interference level of the corresponding channel based on the one or more measured interference levels (S514).

For example, the coexistence management system obtains an average value of the one or more measured interference levels and determines the obtained average value of the interference level as the interference level of the corresponding channel.

On the other hand, if the coexistence management system determines that the one or more WSOs do not perform the measurement, the coexistence management system determines that any of the neighboring WSOs do not have the capability of measuring the interference level, such that it may be determined that the measurement of the interference level using the neighboring WSOs fails (S520).

FIG. 6 is a diagram for describing a channel measuring process according to an exemplary embodiment of the present invention.

As illustrated in FIG. 6, the CM 130 according to the exemplary embodiment of the present invention may transmit a Measurement_Request message for requesting the interference level measurement of the corresponding channel to the CE 140 (S610) and receive a Measurement_Confirm message from the CE 140 as a response thereto (S620).

Next, when the CE 140 receives the Measurement_Request message, the CE 140 may transmit a GetMeasurement.request primitive for requesting the interference level measurement of the corresponding channel to the WSO 150 (S630).

Next, when the WSO 150 receives the GetMeasurement.request primitive, the WSO 150 may measure the interference level of the corresponding channel and transmit a GetMeasurement.response primitive including the measured interference level of the channel to the CE 140 (S640).

Next, when the CE 140 receives the GetMeasurement.response primitive, the CE 140 may transmit a Measurement_Response message including the measured interference information of the channel to the CM 130 (S650) and receive a Measurement_Confirm message from the CM 130 as a response thereto (S660).

In this case, the Request/Response based primitive used herein is shown as in the following [Table 3].

TABLE 3

```
GetMeasurement.request (
            measurementDescription
)
MeasSchedule ::= SEQUENCE {
  measStartTime              REAL,
  numberOfMeasurements       INTEGER
  timeBetweenMeasurements    REAL
}
MeasFreq ::= SEQUENCE {
  measStartAFreq             REAL OPTIONAL,
  measEndFreq                REAL OPTIONAL,
  listOfChNumber             SEQUENCE OF INTEGER OPTIONAL
}
MeasDescr ::= ENUMERATED {
  interferenceLevel,
  ...
}
MeasurementDescription ::= SEQUENCE OF SEQUENCE {
  measDescr      MeasDescr,
  measSchedule   MeasSchedule,
  measFreq       MeasFreq
}
GetMeasurement.response (
            measurementResult)
ReqInfoDescr ::= ENUMERATED {
  interferenceLevel,
  ...
}
ReqInfoValue ::= CHOICE {
  interferenceLevelValue           REAL,
  ...
}
MeasurementResult ::= SEQUENCE OF SEQUENCE {
  reqInfoDescr ReqInfoDescr,
  reqInfoValue ReqInfoValue
}
```

Herein, parameter measStartTime represents a starting time, parameter numberOfMeasurements represents a measurement frequency, parameter timeBetweenMeasurements represents a measurement interval time, parameter measStartAFreq represents a starting frequency, measEndFreq represents an ending frequency, parameter listOfChNumber represents a channel number list, and parameter interferenceLevelValue represents an interference level value.

As in [Table 3], the GetMeasurement.response primitive may include the interference level of the corresponding channel.

The Request/Response based message used herein is shown as in the following [Table 4].

TABLE 4

```
Measurement_Request ::= SEQUENCE {
  measurementDescription    MeasurementDescription
}
Measurement_Response ::= SEQUENCE {
  measurementResult         MeasurementResult
}
Measurement_Confirm ::= SEQUENCE {
}
MeasSchedule ::= SEQUENCE {
  MeasStartTime     REAL,
  numberOfMeasurements      INTEGER,
  timeBetweenMeasurements   REAL
}
MeasFreq ::= SEQUENCE {
  measStartFreq             REAL OPTIONAL,
  measEndFreq               REAL OPTIONAL,
  listOfChNumber            SEQUENCE OF INTEGER OPTIONAL
}
MeasurementDescription ::= SEQUENCE OF SEQUENCE {
  measDescr     ENUMERATED { interferenceLevel ...},
  measFreq      MeasFreq
}
```

TABLE 4-continued

```
MeasurementResult ::= SEQUENCE OF SEQUENCE {
reqInfoDescr      ReqInfoDescr,
reqInfoValue CHOICE { interferenceLevelValue REAL ...}
}
```

As in [Table 4], the Measurement_response message may include the interference level of the corresponding channel.

Figure 7:
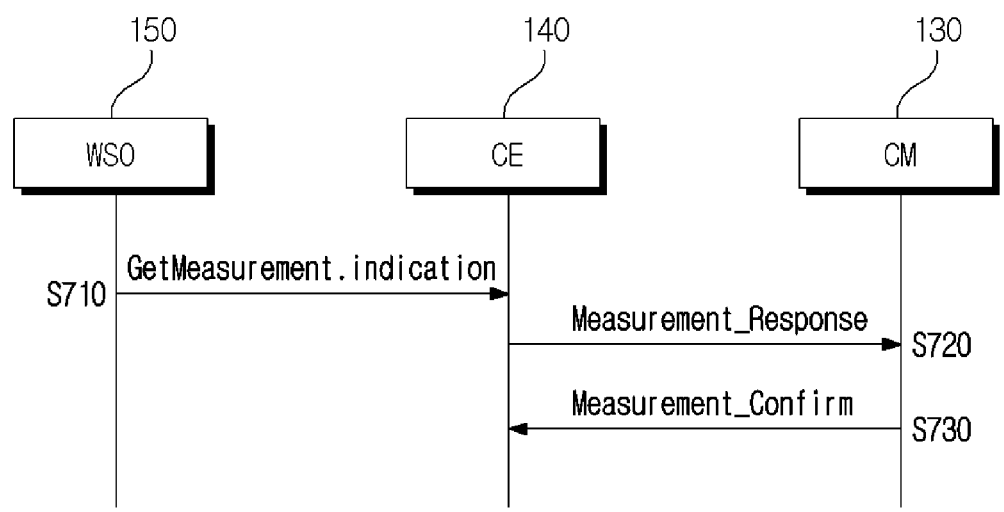
FIG. 7 is a diagram for describing a channel measuring process according to an exemplary embodiment of the present invention.

FIG. 7 is a diagram for describing a channel measuring process according to an exemplary embodiment of the present invention.

As illustrated in FIG. 7, the WSO 150 according to the exemplary embodiment of the present invention may periodically or aperiodically measure the interference level of the corresponding channel and transmit a GetMeasurement.indication primitive including the measured interference level of the channel to the CE 140 (S710).

Next, when the CE 140 receives the GetMeasurement.indication primitive, the CE 140 may transmit a Measurement_Response message including the interference information of the corresponding channel to the CM 130 (S720) and receive a Measurement_Confirm message from the CM 130 as a response thereto (S730).

Figure 8:
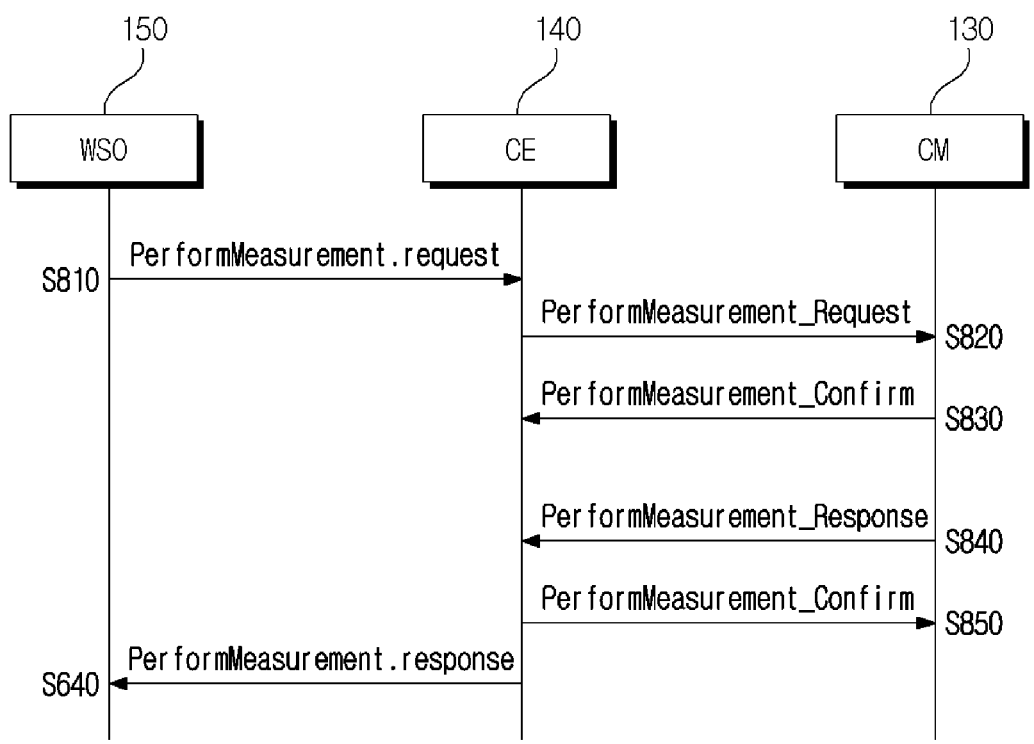
FIG. 8 is a diagram for describing a measurement requesting process according to an exemplary embodiment of the present invention.

FIG. 8 is a diagram for describing a measurement requesting process according to an exemplary embodiment of the present invention.

As illustrated in FIG. 8, the WSO 150 may transmit a PerformMeasurement.request primitive for requesting the channel information measured by one or more neighboring WSOs to the CE 140 (S810).

Next, when the CE 140 receives the PerformMeasurement.request primitive, the CE 140 may transmit a Perform-Measurement.request_message to the CM 130 (S820) and receive a PerformMeasurement_Confirm message from the CM 130 as a response thereto (S830).

In this case, the PerformMeasurement.request primitive and the PerformMeasurement_Request message used herein are each shown as in the following [Table 5] and [Table 6].

TABLE 5

```
PerformMeasurement.request (
         listOfChNumber    OPTIONAL,
         measDefi          OPTIONAL,
         ...
)
ListOfChNumber ::= SEQUENCE OF INTEGER
MeasDefi ::= SEQUENCE OF MeasDefiElement
MeasDefiElement := ENUMERATED {
interferenceLevel
primaryDetection,
tvbdDetection,
...
}
```

Herein, parameter listOfChNumber represents the channel number list, parameter interferenceLevel represents the interference level, parameter primaryDetection represents primary user detection, and parameter tvbdDetection represents TVBD detection.

As in [Table 5], the PerformMeasurement.request primitive may include the channel number list, the interference level, the primary user detection, the TVBD detection, and the like.

TABLE 6

```
PerformMeasurement_Request ::= SEQUENCE {
         listOfChNumber    ListOfChNumber
         OPTIONAL,
         measDefi          MeasDefi OPTIONAL
}
ListOfChNumber ::= SEQUENCE OF INTEGER
MeasDefi ::= SEQUENCE OF MeasDefiElement
MeasDefiElement := ENUMERATED {
interferenceLevel
primaryDetection,
tvbdDetection,
...
}
PerformMeasurement_Confirm ::= SEQUENCE {
}
```

As in [Table 6], the PerformMeasurement_Request message may include the channel number list.

Next, when the CM 130 receives a PerformMeasurement_Request message, the CM 130 may transmit a Perform-Measurement_Response message for providing the channel information measured by the one or more neighboring WSOs to the CE 140 (S840) and receive a PerformMeasurement_Confirm message from the CE 140 as a response thereto (S850).

Next, when the CE 140 receives the PerformMeasurement_Response message, the CE 140 may transmit a PerformMeasurement.response primitive to its own corresponding WSO 150 (S860).

In this case, the PerformMeasurement.response primitive and the PerformMeasurement_Response message used herein are each shown as in the following [Table 7] and [Table 8].

TABLE 7

```
PerfomMeasurement.response(
         measurementReport      OPTIONAL
)
MeasurementReport ::= SEQUENCE {
         listOfChNumber         ListOfChNumber,
measDefi                        MeasDefi,
measValue                       MeasValue
}
ListOfChNumber ::= SEQUENCE OF INTEGER
MeasDefi ::= SEQUENCE OF MeasDefiElement
MeasDefiElement := ENUMERATED {
interferenceLevel
primaryDetection,
tvbdDetection,
...
}
MeasValue :: = SEQUENCE OF MeasValueElement
MeasValueElement :: =   CHOICE {
interferenceLevelValue                 REAL,
primaryDetection                       BOOLEAN,
tvbdDetection                          BOOLEAN,
...
}
```

As in [Table 7], the PerformMeasurement.response primitive may include the channel number list, the interference level, the primary user detection, the TVBD detection, and the like.

TABLE 8

```
PerformMeasurement_Response ::= SEQUENCE {
   measurementReport    MeasurementReport    OPTIONAL
}
MeasurementReport ::= SEQUENCE {
         listOfChNumber        ListOfChNumber,
measDefi                       MeasDefi,
```

TABLE 8-continued

```
    measValue           MeasValue
}
PerformMeasurement_Confirm ::= SEQUENCE {
}
```

As in [Table 8], the PerformMeasurement_Response message may include the channel number list, the interference level, the primary user detection, the TVBD detection, and the like.

Meanwhile, even though it is described that all the components configuring the exemplary embodiment of the present invention as described above are coupled as one or are operated by being coupled with each other, the present invention is not necessarily limited to the exemplary embodiments. That is, all the components may be operated by being optionally coupled with each other within the scope of the present invention. All the components may be each implemented in one independent hardware, but a part or all of the respective components may be selectively combined to be implemented as a computer program having a program module performing some functions or all the functions combined in one or a plurality of hardwares. The computer program is stored in computer readable media, such as a USB memory, a CD disk, a flash memory, and the like, to be read and executed by a computer, thereby implementing the exemplary embodiment of the present invention. An example of the storage media of the computer program may include a magnetic recording medium, an optical recording medium, a carrier wave medium, and the like.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A coexistence management system for measuring channel information, comprising:
    a coexistence set including a plurality of white space objects (WSOs); and
    a coexistence manager (CM) configured to check whether a target WSO included in the coexistence set has a measurement capability of channel information, which is a capability for measuring channel information of an operating channel, and when the target WSO does not have the measurement capability of the channel information, measure the channel information through at least one other WSO included in the coexistence set.

2. The coexistence management system of claim 1, further comprising:
    a plurality of coexistence enablers (CEs) provided for the plurality of WSOs, respectively,
    wherein, the CM is configured to check the measurement capability of the channel information or measure the channel information by interacting with the plurality of CEs.

3. The coexistence management system of claim 1, wherein the CM is configured to transmit the channel information measured through the at least one other WSO to the target WSO.

4. The coexistence management system of claim 1, wherein the channel information comprises information related to an interference level of the operating channel.

5. The coexistence management system of claim 1, wherein the measurement capability of the channel information comprises at least an energy detection capability or a feature detection capability.

6. The coexistence management system of claim 1, wherein configuration information of the plurality of WSOs is registered on the CM, and the CM confirms the plurality of WSOs included in the coexistence set based on the configuration information.

7. The coexistence management system of claim 6, further comprising:
    a coexistence discovery and information server (CDIS) configured to be linked with a plurality of CMs, and to obtain configuration information registered on the plurality of CMs,
    wherein, the CDIS is configured to confirm the plurality of WSOs included in the coexistence set based on the configuration information obtained from the plurality of CMs.

8. The coexistence management system of claim 1, wherein when the target WSO does not have the measurement capability of the channel information, the CM is configured to select one of the plurality of WSOs included in the coexistence set, and check whether the selected WSO has the measurement capability of channel information.

9. The coexistence management system of claim 8, wherein the CM is configured to select one of the plurality of WSOs beginning from a WSO that is located in the most near distance from the target WSO.

10. The coexistence management system of claim 8, wherein when the selected WSO has the measurement capability of the channel information, the CM is configured to measure the channel information through the selected WSO.

11. The coexistence management system of claim 10, wherein the CM is configured to transmit the channel information measured through the selected WSO to the target WSO.

12. The coexistence management system of claim 1, wherein the CM is configured to check whether all the plurality of WSOs included in the coexistence set have the measurement capability of channel information.

13. The coexistence management system of claim 12, wherein the CM is configured to measure the channel information through at least one WSO having the measurement capability of the channel information among the plurality of WSOs.

14. The coexistence management system of claim 13, wherein the CM is configured to compute channel information of the coexistence set based on the channel information measured though the at least one WSO.

15. The coexistence management system of claim 14, wherein the CM is configured to compute the channel information of the coexistence set by calculating an average value of the channel information measured though the at least one WSO.

16. The coexistence management system of claim 14, wherein the CM is configured to transmit the channel information of the coexistence set to the target WSO.

17. A method for measuring channel information in a coexistence set, the coexistence set including a plurality of White Space Objects (WSOs), the method comprising:
   checking whether a target WSO included in the coexistence set has a measurement capability of channel information, which is a capability for measuring channel information of an operating channel;
   measuring the channel information through at least one other WSO included in the coexistence set, when the target WSO does not have the measurement capability of the channel information.

18. The method of claim 17, wherein the checking includes:
   selecting one of the plurality of WSOs included in the coexistence set, when the target WSO does not have the measurement capability of the channel information; and
   checking whether the selected WSO has the measurement capability of the channel information.

19. The method of claim 17, wherein the checking includes:
   checking whether all the plurality of WSOs included in the coexistence set have the measurement capability of the channel information.

\* \* \* \* \*